April 4, 1939.   W. KRÄMER   2,153,378
CURRENT RESPONSIVE ARRANGEMENT
Filed April 4, 1938   2 Sheets-Sheet 1
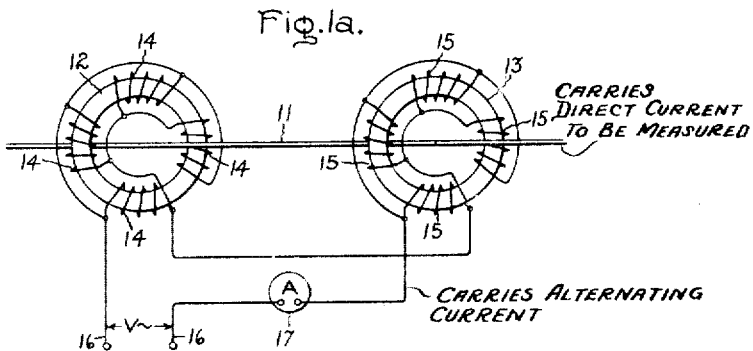
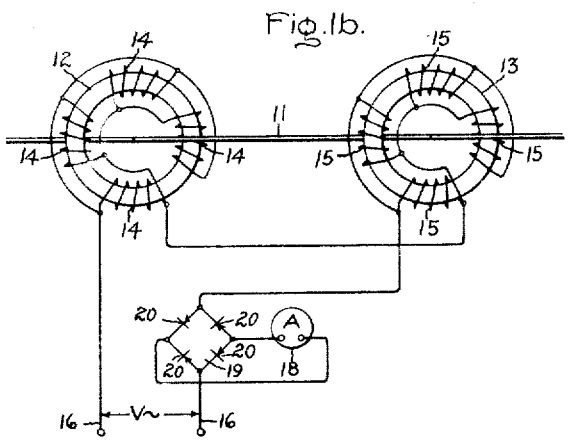
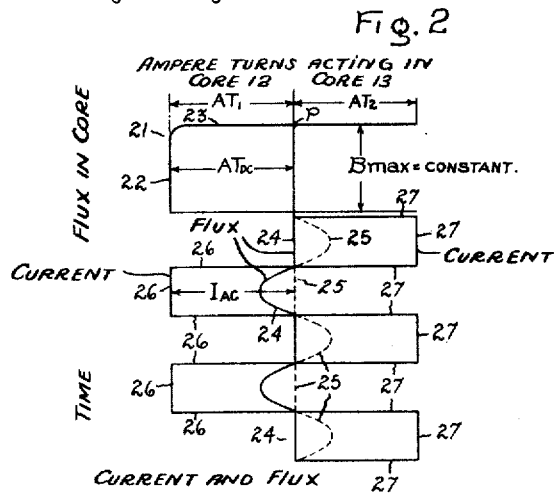
Inventor:
Werner Krämer,
by Harry E. Dunham
His Attorney.

April 4, 1939.                    W. KRÄMER                         2,153,378
                        CURRENT RESPONSIVE ARRANGEMENT
                Filed April 4, 1938            2 Sheets-Sheet 2
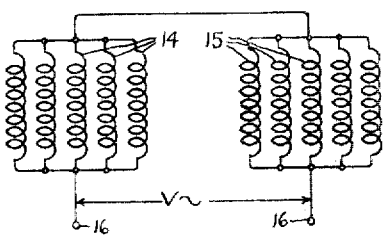
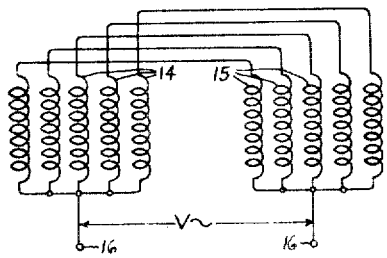
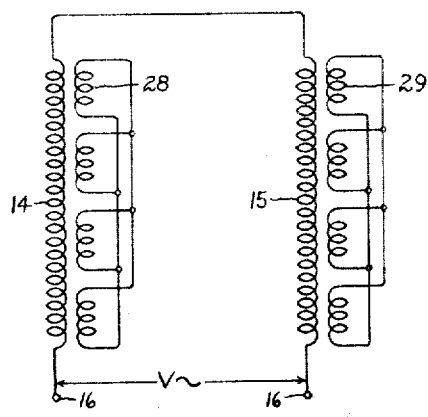
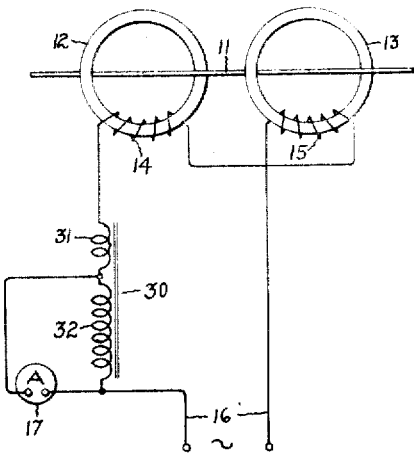
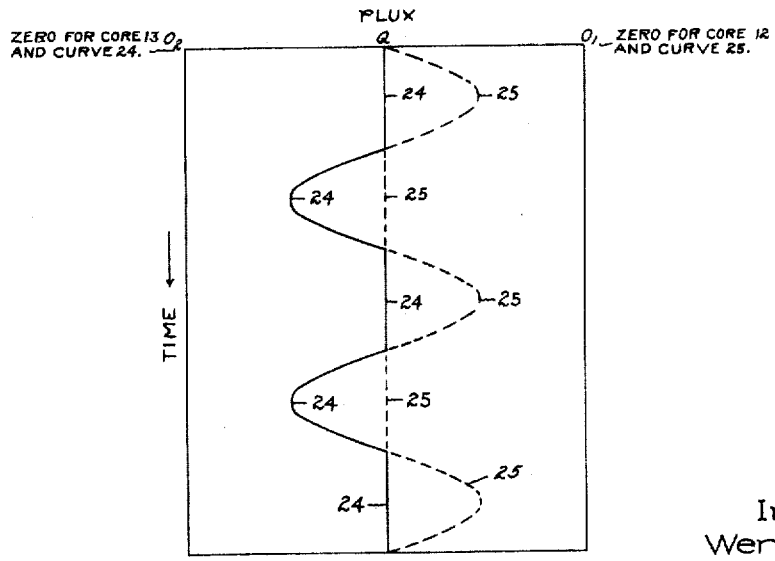
Inventor:
Werner Krämer,
by Harry E. Dunham
His Attorney.

Patented Apr. 4, 1939

2,153,378

UNITED STATES PATENT OFFICE 2,153,378

CURRENT RESPONSIVE ARRANGEMENT

Werner Krämer, Berlin-Karlshorst, Germany, assignor to General Electric Company, a corporation of New York Application April 4, 1938, Serial No. 199,991
In Germany April 16, 1937

5 Claims. (Cl. 171—95)

My invention relates to current responsive arrangements and concerns particularly apparatus for measuring and detecting direct current.

It is an object of my invention to provide a direct current measuring arrangement of high accuracy in which the measuring instrument itself need not be of the same current capacity as the circuit in which the current is to be measured and in which the measuring instrument may be insulated from the circuit in which the current is to be measured.

It is an object of my invention to provide a direct current measuring arrangement of the induction type in which an auxiliary alternating current source is employed.

It is an object of my invention to provide a direct current measuring instrument in which genuine transformer action is obtained so that the current flowing in the measuring instrument is independent of the voltage in the circuit in which the measured current is flowing and independent of the voltage of the auxiliary circuit.

It is a further object of my invention to provide an arrangement in which pure compensation between a.-c. and d.-c. windings is provided. Other and further objects and advantages will become apparent as the description proceeds.

In carrying out my invention in its preferred form I provide a pair of closed magnetic cores with alternating-current and direct-current windings and, I connect the alternating current windings in opposition to a source of alternating current in series with an alternating current responsive instrument. The direct-current windings, of course, carry the direct current to be measured. The magnetic cores are composed of material having a substantially rectangular magnetization curve and the cores and windings are so designed that the magnetic material operates in the substantially horizontal portion of the magnetization curve.

The invention may be understood more readily from the following detailed description when considered in connection with the accompanying drawings and those features of the invention which are believed to be novel and patentable will be pointed out in the claims appended hereto. In the drawings Fig. 1a is a schematic diagram representing an embodiment of my invention in which a simple alternating current responsive instrument is employed and Fig. 1b represents another embodiment of my invention in which a rectifier instrument is employed. Fig. 2 is a graph explaining the principle of operation of my invention. Fig. 3 is a connection diagram representing connections of embodiments of Figs. 1a and 1b. Fig. 4 is a connection diagram representing a modification in the arrangement of Fig. 3. Fig. 5 is a schematic diagram of an embodiment of my invention including windings for compensating the effect of variations in position of the direct current winding in the cores. Fig. 6 is a connection diagram of another modified embodiment. Fig. 7 is a graph showing separately one of the curves of Fig. 2. Like reference characters are utilized throughout the drawings to designate like parts.

In the arrangement illustrated in Fig. 1a, there is a direct current winding which may be in the form of a single rod or bar 11 carrying a direct current which is to be measured, and, in inductive relation to the direct current winding 11, are a pair of magnetic cores 12 and 13. The cores 12 and 13 are preferably laminated or are strip-wound from magnetic strip material and they are shown as continuous rings surrounding the direct current winding or rod 11. Each of the cores 12 and 13 carries an alternating current winding and preferably the windings are divided so that the core 12 carries a plurality of alternating current windings 14 and the core 13 carries a plurality of alternating current windings 15. The windings 14 of the core 12 may be connected in parallel and likewise, the windings 15 of the core 13 may be connected in parallel. A source of alternating current 16 is provided, to which the alternating current windings of the cores 12 and 13 are connected in opposition. The multiple group of windings 14 may be connected in series with the multiple group of windings 15. In series with the multiple groups and the alternating current source 16 is connected an alternating current responsive device 17 which may take the form of a deflecting ammeter.

In the arrangement of Fig. 1b a direct current responsive device 18 is provided which may take the form of a D'Arsonval galvanometer, for example, which may be made more sensitive than the ordinary alternating current responsive instruments, and the direct current responsive device 18 is connected in the circuit of the alternating current source 16 through the medium of a full-wave rectifier 19 consisting of four rectifier units 20 which are arranged in the well-known bridge or Graetz connection so that the rectifier 19 and the direct current responsive device 18 together form an alternating current responsive unit.

The cores 12 and 13 are composed of a material having a substantially rectangular magnetization curve and the design is such that the core material is operated in a substantially horizontal portion of the magnetization curve. In Fig. 2 the curve 21 illustrates a substantially rectangular magnetization curve in which there is an initial portion 22 substantially vertical, and remaining portion 23 substantially horizontal. In the curve 21 the values of flux density are plotted along the vertical axis and the values of magnetizing force in ampere turns are plotted along the horizontal axis. Thus, it is seen that when the ampere turns increase above a relatively small initial value the flux density reaches its maximum value $B_{max}$ and continues at this value indefinitely.

Any suitable material for obtaining such a substantially rectangular magnetization curve may be employed. However, I have found that satisfactory results may be obtained by utilizing a material prepared by the Fried. Krupp A.-G. in Essen, Germany under the name "Hyperm." Such material is an alloy of iron and nickel. Iron silicon alloy sold under the name "Hyperm 4" may also be utilized satisfactorily, which is an alloy containing 3 to 4 per cent silicon cold rolled and suitably heat treated. Such material has its maximum permeability in the direction of the rolling and preferably, the cores are made by winding a strip flat-wise into a ring when this material is employed.

I have also found an alloy sold under the trade name of "Mu-Metal" to be satisfactory, which consists of approximately 74% nickel, 20% iron, 4% copper, 1½% chromium, and with lesser amounts of manganese and silicon.

Although it may seem, at first, paradoxical that pure compensation or transformer action could take place between primary direct current windings and secondary alternating current windings, it may be seen that such a result is actually achieved in my apparatus. As already stated, the curve 21 in Fig. 2 represents the magnetization curve of the transformer cores, i. e., of the material of which the cores 12 and 13 are composed. The portion of the curve 23, in which the apparatus is operated is substantially horizontal. For the sake of explanation, let it be assumed that the direct current magnetizing force of the current in the rod 11, $AT_{DC}$, is of such a value as to correspond to the point P of the magnetization curve 21. If an alternating voltage is applied to the secondary windings 14 and 15, an alternating flux must be superimposed upon the unidirectional flux to correspond to the applied voltage.

It is also assumed that in the first half-cycle the alternating current magnetization, $AT_1$, in the core 12 opposes the direct current magnetization, but the a.-c. magnetization, $AT_2$, in the core 13 aids the direct current magnetization $AR_{DC}$. Then as shown by the curve 21 in Fig. 2, the flux or magnetic induction in the core 13 cannot rise further since it is already saturated. The core 13 can have no effect on the limitation of magnetizing current during the first or any odd half-cycle since no back voltage can be generated in the windings 15 by increase of flux. In the core 12, however, the flux needs to be reduced to generate the requisite back voltage for controlling the flow of alternating current and the control of the alternating current takes place by reason of such flux reduction. During the next half-cycle, in a similar manner, the flux needs to be reduced in the core 13 in order to induce a back voltage of the proper polarity. The flux in the core 13 is represented by the heavy line curve 24 in Figs. 2 and 7 in which flux is plotted along the horizontal axis and time is plotted in the vertical direction. To avoid confusion, the flux curve alone has been duplicated in Fig. 7, in which $O_2$ is the zero point of flux and time for core 13, and the distance $O_2Q$ represents the flux due to the unidirectional magnetization $AT_{DC}$ by the current in the d.-c. winding 11.

Since the a.-c. windings in the cores 12 and 13 are oppositely connected, the d.-c. premagnetizations with respect to the a.-c. circuit are opposite and the flux in the core 12 will remain constant during even half-cycles and will be reduced along a sinusoidal curve during odd half-cycles as shown by the dotted line curve 25 in Figs. 2 and 7. However, in order to show the curves 24 and 25 in juxtaposition the zero point of flux and time of the curve 25 for core 12 has been placed at $O_1$ in Fig. 7., $O_1Q$ being with respect to the curve 25, the d.-c. magnetization.

In order that the flux in the core 13 can be lowered as shown by the curve 24 it is necessary that the direct current premagnetization $O_2Q$ be compensated by an equally strong alternating current magnetizing force, for as seen from curve 21, the resultant magnetizing force must fall substantially to zero before the flux density can be reduced from the value $B_{max}$. Furthermore, the compensating alternating current will have a square wave shape, since the portion 22 of the curve 21 is substantially vertical and extremely minute variation in instantaneous magnetizing current in the vicinity of zero will produce the requisite variation in altitude of the sinusoidal portion of the flux curve 24. The current which must flow in the a.-c. windings 15 of the core 13 to produce the flux wave 24 is shown in Fig. 2 by the curve 26, and the current which must flow in the a.-c. windings 14 of the core 12 to produce the flux wave 25 is shown in Fig. 2 by the curve 27. The alternating-current windings 14 and 15 function alternately in restraining the alternating current supplied by the voltage source 16 and the current in the alternating-circuit is shown by the composite square wave 26—27 of Fig. 2. The maximum value, which is also the effective value, corresponds to the current flowing in the d.-c. winding 11, since the a.-c. magnetizations $AT_1$ and $AT_2$ must equal the d.-c. magnetization $AT_{DC}$, i. e., $$I_{AC} \times N_{AC} = I_{DC} \times N_{DC}$$

where $I_{AC}$ is the effective value of the current in windings 14 and 15, $N_{AC}$ is the number of turns in either winding, $I_{DC}$ is the value of current in the winding 11 and $N_{DC}$ is the number of turns, in this case only one, since the winding 11 is shown as a straight bar. In Fig. 2 the alternating current 26—27 has been shown to the same scale as the corresponding a.-c. ampere turns or magnetizing forces $AT_2$ and $AT_1$.

From the foregoing it is seen that each of the cores 12 and 13 develops half the flux wave, and together they give rise to a square-waved alternating current in the instrument 17. The magnitude of the voltage V of the source 16, however, is without appreciable effect upon the magnitude of the current for the reason that the current is governed only by the amount of compensation needed to overcome the effect of the primary or direct current. Theoretically, the voltage V may fluctuate between the values O and $2 \times K \times B_{max}$ without any change in alternating or secondary current, where K is a constant dependent upon the dimensions of the transformer, such as the number of turns, and the cross-sectional area of the core and $B_{max}$ is the altitude of the horizontal portion 23 of the curve 21 in Fig. 2, expressed in Gausses. In other words, the voltage V might have any value up to that for which the peak value of the flux wave 24—25 would correspond to a flux density of $B_{max}$. In practice, however, the transformer formed by the cores and windings of Fig. 1a must be loaded with a burden having finite impedance. If the impedance of the instrument 17 constituting the burden is Z the minimum value of the voltage V of the source 16 must be greater than $I_{ac}Z$, since the power required to energize the instrument 17 can be furnished only by the a.-c. supply 16.

Just as the apparatus has been shown to be independent of voltage variation it is likewise independent of variations in excitation.

If the rectangular magnetization curve 21 of Fig. 2 is taken as the basis for an ideal alternating-current transformer, then the direct current transformer heretofore described has the following properties in common with alternating-current transformers:

(1) Constant ratio of transformation.
(2) Frequency independence.
(3) Load independence.

If the alternating current of the secondary side is rectified by using the rectifier 19, of Fig. 1b, its rectangular wave form results in a wave-free or perfectly smooth direct current which bears a constant ratio to the direct current flowing in the primary winding 11.

Even great distortions of the alternating voltage exercise no noticeable effect upon the secondary current, since they have no influence on the size of the compensation ampere-turns or magnetizing force. Voltage variations distort only the self-forming exciting current, which is infinitely small, occurring as a fault current in an ideal transformer.

Fluctuations in the direct current flowing in the primary winding 11 reappear as fluctuations in the maximum and effective value of the rectangular a.-c. wave in the secondary windings 14 and 15, in spite of the opposing connections of the windings on the cores 12 and 13. This action takes place owing to the magnetic ineffectiveness of one or the other of the transformer cores during each half-cycle and thus perfects the picture of the pure transformer.

Thus far the apparatus has been considered as a purely direct current transformer and hence loading only by an ohmic burden has been assumed. If the secondary current is rectified, as illustrated in Fig. 1b by the use of the rectifier 19, the possibility of any other type of loading is eliminated. If the transformer of Fig. 1a without rectification of the secondary current had its secondary windings 14 and 15 loaded with an inductive burden, it was to be expected that the transformer would act in a way which has no parallel in connection with alternating current transformers. With an inductive circuit one might anticipate that the vertical fronts of the secondary current half-waves would be somewhat flattened even in the case of a transformer of unlimited output capacity owing to the high impedance of inductive loads to such waves. Consequently, in the ideal case particularly with perfectly rectangular waves, there would be a possibility of a transformer fault, and I consider it advantageous to employ the rectifier 19 in the secondary circuit (Fig. 1b). The ideal, perfectly rectangular, magnetization curve is best met in practice by using a highly permeable core material with a sharp saturation bend such as the nickel-iron alloys or other materials already mentioned.

In cases where there is a possibility that the relative position of the direct-current windings 11 in the cores 12 and 13 may vary, it is desirable to use a series parallel connection instead of a simple series or parallel connection, in order to maintain the alternating flux induction the same throughout the cores 12 and 13. With non-concentric direct current fields an alternating effect tends to occur between the unidirectional flux and the alternating flux as one seeks to displace the other. Thus a weak alternating flux would tend to appear in the parts of the core saturated with direct current, contrary to the principle of operation of the apparatus. Normal operating conditions are obtained by subdividing the alternating current windings of each core into several groups having equal numbers of turns. The groups of each core are connected to form a unit which is connected in opposition to a corresponding unit of the other core. Such connections are shown in Figs. 1a, 1b and 3. A modification in the connections is shown in Fig. 4. With these connections the alternating flux induction is constant in every part of the ring. If different direct-current field strengths occur in different parts of the cores 12 and 13, the transformer, in effect, consists of several direct current transformers connected in parallel and which carry different secondary currents corresponding to components of different strengths of the direct current ampere-turns and magnetization. With the series parallel connection of the secondary windings the apparatus to a high degree is unaffected by variations in position within the core of the direct-current primary conductor 11.

A simple series connection of the secondary winding may, however, be retained without sacrificing the advantages of series parallel connection, if compensating windings 28 and 29 connected in parallel in several groups as shown in Fig. 5 are mounted on the cores 14 and 15 respectively.

It will be understood that since a material with a perfect rectangular magnetization curve having an absolutely horizontal portion is not known, complete conformity in practice with the foregoing theoretical explanations will not be obtained. However, I have found that the actual performance conforms very closely with the theoretical assumption. When Mu-metal, for example, is employed as the core material, a d.-c. transformer may be produced at relatively small cost for material, in which an accuracy of $\pm 0.5$ to 1 per cent is obtained over a wide load range. Even with a fluctuation in the auxiliary alternating voltage of $\pm 30$ per cent, far in excess of what might ever occur, the fluctuation in the secondary current does not exceed $\pm 0.2$ per cent.

In Fig. 6, I have shown another modification in connections for the purpose of compensation. It is well known to change the number of turns in the secondary winding of a transformer for the purpose of compensation. However, this is not convenient in case several windings are operated in multiple. Accordingly, I may employ an auxiliary alternating current transformer 30, which may be an auto-transformer with a winding divided into sections 31 and 32. The primary winding 31—32 is connected in series with the current source 16 and the a.-c. transformer secondary windings 14 and 15, whereas the secondary winding 32 is connected to the instrument 17. Obviously, the transformer 30 may be relatively small since the principal section 32 thereof carries only the small difference current between the primary and secondary currents.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. An induction measuring system for direct current comprising a core composed of highly saturable magnetic material of such dimensions as to be saturated throughout the range of direct currents to be measured, a direct-current winding in inductive relation thereto, an alternating-current winding also in inductive relation to said core, a source of alternating current and an instrument in series with said source and said alternating-current winding.

2. An induction measuring system comprising a core composed of highly saturable magnetic material, means for subjecting said core to unidirectional magnetizing force responsive to a quantity to be measured, said core and said means having such dimensions that said core is saturated throughout the range of operation of the apparatus, means for subjecting said core to alternating magnetizing force, a source of alternating current for energizing said latter means and a current responsive instrument in series with said source and said latter means.

3. An induction measuring system comprising a core composed of highly saturable magnetic material, means for subjecting said core to unidirectional magnetizing force responsive to a quantity to be measured, said core and said means having such dimensions that said core is saturated throughout the range of operation of the apparatus, means for subjecting said core to alternating magnetizing force, a source of alternating current for energizing said latter means and a rectifier in series with said source and said latter means and a direct current instrument energized by said rectifier.

4. A direct-current transformer comprising a direct-current primary winding, a core of saturable magnetic material in inductive relation therewith, said winding and core being of such dimensions that the core is saturated throughout the range of operation of the apparatus, an alternating-current winding in inductive relation with said core, a source of alternating current, a rectifier having input terminals in series with said source and said alternating-current winding and having output terminals from which direct current is obtained.

5. An induction measuring system for direct current comprising a pair of magnetic cores, direct-current windings in inductive relation to said cores and carrying a direct current to be measured, a plurality of alternating-current windings on each of said cores, the alternating-current windings of each core being connected in multiple, a source of alternating current and an alternating-current responsive device, said current responsive device with a multiple group of alternating-current windings in one core and a multiple group of alternating current windings in the second core being connected in series to said source of alternating current, said cores being composed of material having substantially rectangular magnetization curves and being operated within the horizontal portions of the curves.

WERNER KRÄMER.

Certificate of Correction

Patent No. 2,153,378.　　　　　　　　　　　　　　　　April 4, 1939.

WERNER KRÄMER

It is hereby certified that errors appear in the printed specification of the above numbered patent requiring correction as follows: Page 2, first column, line 59, for "AR$_{DC}$" read $AT_{DC}$; and second column, lines 65–66, for "magniture" read *magnitude;* and that the said Letters Patent should be read with these corrections therein that the same may conform to the record of the case in the Patent Office.

Signed and sealed this 6th day of June, A. D. 1939.

[SEAL]　　　　　　　　　　　　　　　　　　　　Henry Van Arsdale
　　　　　　　　　　　　　　　　　　　　　　　　*Acting Commissioner of Patents.* ondary windings 14 and 15, whereas the secondary winding 32 is connected to the instrument 17. Obviously, the transformer 30 may be relatively small since the principal section 32 thereof carries only the small difference current between the primary and secondary currents.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. An induction measuring system for direct current comprising a core composed of highly saturable magnetic material of such dimensions as to be saturated throughout the range of direct currents to be measured, a direct-current winding in inductive relation thereto, an alternating-current winding also in inductive relation to said core, a source of alternating current and an instrument in series with said source and said alternating-current winding.

2. An induction measuring system comprising a core composed of highly saturable magnetic material, means for subjecting said core to unidirectional magnetizing force responsive to a quantity to be measured, said core and said means having such dimensions that said core is saturated throughout the range of operation of the apparatus, means for subjecting said core to alternating magnetizing force, a source of alternating current for energizing said latter means and a current responsive instrument in series with said source and said latter means.

3. An induction measuring system comprising a core composed of highly saturable magnetic material, means for subjecting said core to unidirectional magnetizing force responsive to a quantity to be measured, said core and said means having such dimensions that said core is saturated throughout the range of operation of the apparatus, means for subjecting said core to alternating magnetizing force, a source of alternating current for energizing said latter means and a rectifier in series with said source and said latter means and a direct current instrument energized by said rectifier.

4. A direct-current transformer comprising a direct-current primary winding, a core of saturable magnetic material in inductive relation therewith, said winding and core being of such dimensions that the core is saturated throughout the range of operation of the apparatus, an alternating-current winding in inductive relation with said core, a source of alternating current, a rectifier having input terminals in series with said source and said alternating-current winding and having output terminals from which direct current is obtained.

5. An induction measuring system for direct current comprising a pair of magnetic cores, direct-current windings in inductive relation to said cores and carrying a direct current to be measured, a plurality of alternating-current windings on each of said cores, the alternating-current windings of each core being connected in multiple, a source of alternating current and an alternating-current responsive device, said current responsive device with a multiple group of alternating-current windings in one core and a multiple group of alternating current windings in the second core being connected in series to said source of alternating current, said cores being composed of material having substantially rectangular magnetization curves and being operated within the horizontal portions of the curves.

WERNER KRÄMER.

Certificate of Correction

Patent No. 2,153,378.   April 4, 1939.

WERNER KRÄMER

It is hereby certified that errors appear in the printed specification of the above numbered patent requiring correction as follows: Page 2, first column, line 59, for "$AR_{DC}$" read $AT_{DC}$; and second column, lines 65–66, for "magniture" read *magnitude;* and that the said Letters Patent should be read with these corrections therein that the same may conform to the record of the case in the Patent Office.

Signed and sealed this 6th day of June, A. D. 1939.

[SEAL]

Henry Van Arsdale
*Acting Commissioner of Patents.*